United States Patent
Yang et al.

(10) Patent No.: US 11,384,270 B2
(45) Date of Patent: *Jul. 12, 2022

(54) NON-FLAMMABLE MIXED REFRIGERANT CAPABLE OF REDUCING GREENHOUSE EFFECT AND USE THEREOF

(71) Applicant: JIANGXI TIANYU CHEMICAL CO., LTD., Jiangxi (CN)

(72) Inventors: Xi Yang, Jiangxi (CN); Xiaori Yue, Jiangxi (CN)

(73) Assignee: JIANGXI TIANYU CHEMICAL CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/205,231

(22) Filed: Mar. 18, 2021

(65) Prior Publication Data

US 2021/0198546 A1 Jul. 1, 2021

Related U.S. Application Data

(63) Continuation of application No. 16/609,325, filed as application No. PCT/CN2019/072964 on Jan. 24, 2019, now Pat. No. 10,988,650.

(30) Foreign Application Priority Data

Apr. 2, 2018 (CN) .......................... 201810282002.2

(51) Int. Cl.
 *C09K 5/04* (2006.01)
(52) U.S. Cl.
 CPC .......... *C09K 5/04* (2013.01); *C09K 2205/126* (2013.01); *C09K 2205/32* (2013.01); *C09K 2205/40* (2013.01)

(58) Field of Classification Search
 None
 See application file for complete search history.

(56) References Cited

U.S. PATENT DOCUMENTS

| 9,523,027 B2 * | 12/2016 | Minor | F25B 1/005 |
| 9,540,554 B2 * | 1/2017 | Minor | F25B 45/00 |
| 2012/0255316 A1 * | 10/2012 | Andre | C09K 5/044 |
| | | | 62/271 |
| 2012/0305480 A1 * | 12/2012 | Low | C09K 3/30 |
| | | | 252/364 |
| 2013/0119299 A1 * | 5/2013 | Low | C11D 7/5018 |
| | | | 165/104.19 |
| 2013/0246288 A1 * | 9/2013 | Van Horn | C09K 5/045 |
| | | | 705/308 |
| 2014/0331697 A1 * | 11/2014 | Minor | C09K 5/045 |
| | | | 62/515 |
| 2015/0202581 A1 * | 7/2015 | Low | C09K 23/007 |
| | | | 705/317 |
| 2016/0017199 A1 * | 1/2016 | Yana Motta | C09K 5/044 |
| | | | 252/67 |
| 2017/0327759 A1 * | 11/2017 | Takahashi | C10M 105/38 |
| 2017/0369754 A1 * | 12/2017 | Nishida | C09K 5/047 |
| 2018/0057725 A1 | 3/2018 | Yana Motta et al. | |

FOREIGN PATENT DOCUMENTS

| CN | 102015956 A | 4/2011 |
| CN | 102762686 | 10/2012 |
| CN | 102762686 A | 10/2012 |
| CN | 102782076 A | 11/2012 |
| CN | 102782078 A | 11/2012 |
| CN | 102918132 A | 2/2013 |
| CN | 102971394 | 3/2013 |
| CN | 102971394 A | 3/2013 |
| CN | 104105775 | 10/2014 |
| CN | 104105775 A | 10/2014 |
| CN | 104232022 A | 12/2014 |
| CN | 105378023 A | 3/2016 |
| CN | 105754553 A | 7/2016 |
| CN | 105860934 A | 8/2016 |
| CN | 106687556 A | 5/2017 |

(Continued)

OTHER PUBLICATIONS

First Office Action in CN Patent Application No. 201810282002.2 dated Aug. 21, 2020.

(Continued)

*Primary Examiner* — Joseph D Anthony
(74) *Attorney, Agent, or Firm* — Dilworth IP, LLC

(57) ABSTRACT

Provided are a mixed refrigerant that is non-flammable and capable of reducing the greenhouse effect, and the use thereof. The mixed refrigerant comprises the following components in mass fractions: 10%-30% of R134a, 5%-70% of R1234ze(E), and 18%-65% of R1234yf. The mixed refrigerant of the present invention, in fitting combination with the amount ranges of all the components, makes the refrigerant non-flammable, and the ODP thereof is 0, and the GWP thereof is no greater than 400. The mixed refrigerant can be used in a refrigeration system, has no ozone destructive power, reduces the greenhouse effect, has a lower temperature glide, and belongs to ternary azeotropic or nearly azeotropic refrigerants, which is beneficial to the stable operation of a refrigeration system. The mixed refrigerant of the present invention can also serve as a foaming agent or aerosol propellant, and has the advantages of being non-flammable, having a low ozone destruction index, and being environmentally friendly and safe and reliable.

6 Claims, No Drawings

(56) References Cited

FOREIGN PATENT DOCUMENTS

| | | |
|---|---|---|
| CN | 107746703 A | 3/2018 |
| WO | 2013192069 A1 | 12/2013 |
| WO | 2013192075 A1 | 12/2013 |
| WO | 2014072711 A1 | 5/2014 |
| WO | 2016203827 A1 | 12/2016 |
| WO | 2017062642 A1 | 4/2017 |

OTHER PUBLICATIONS

Second Office Action in CN Patent Application No. 201810282002.2 dated May 7, 2021.
First Office Action in U.S. Appl. No. 16/609,325 dated Dec. 24, 2020.
International Search Report issued in PCT Application No. PCT/CN2019/072964 dated Apr. 29, 2019.

* cited by examiner

NON-FLAMMABLE MIXED REFRIGERANT CAPABLE OF REDUCING GREENHOUSE EFFECT AND USE THEREOF

TECHNICAL FIELD

The present disclosure belongs to the technical field of refrigerants, and relates to a mixed refrigerant and use thereof, and particularly relates to a mixed refrigerant, which is non-flammable and can reduce the greenhouse effect, and use thereof.

BACKGROUND

The increasing concerns about environmental protection have accelerated the phase-out pace of chlorofluorocarbons (CFCs) and hydrochlorofluorocarbons (HCFCs). At present, there are two alternatives: Germany and some countries in northern Europe advocate the use of natural working fluids such as $CO_2$, $NH_3$ and HCs; the United States and Japan advocate the use of synthetic hydrofluorocarbons (HFCs), such as R134a, R410A and R407C etc. Honeywell and DuPont have developed new refrigerant hydrofluoroolefins (HFOs), such as R1234yf, R1234ze and so on. Due to the high global warming potential (GWP) of HFCs, the Kigali Amendment to the 28th Meeting of the Montreal Protocol brought out a gradual reduction plan for HFCs. At present, R1234yf or $CO_2$ has been used in automotive air conditioners to replace the original R134a. Although HFO refrigerants have a low GWP, they are currently only used in automotive air conditioners due to flammability problems. The $CO_2$ pressure on the high pressure side of the transcritical cycle is about 12 MPa, which requires high pressure resistant system, so the $CO_2$ application is greatly limited.

According to the latest EU F-gas regulations: by 2015, household freezing/cooling equipment will be prohibited from using refrigerants with a GWP ≥150; by 2020, fully enclosed commercial freezing/cooling equipment will be prohibited from using refrigerants with a GWP ≥2500 and by 2022, the same will be prohibited from using refrigerants with a GWP ≥150; by 2020, stationary refrigeration equipment (excluding equipment that are designed to cool products to temperatures below −50° C.) will be prohibited from using refrigerants with a GWP ≥2500; by 2022, commercial centralized refrigeration systems with a cooling capacity of greater than 40 kW, will be prohibited from using refrigerants with a GWP ≥150, excluding refrigerants used in the primary circulation of cascade systems, which may have a GWP of less than 1500; by 2020, fully enclosed movable space air conditioners will be prohibited from using refrigerants with a GWP ≥150; by 2025, split air conditioners charged with less than 3 kg of HFCs will be prohibited from using refrigerants with a GWP ≥750.

At present, the environmentally-friendly refrigerants on the market are mainly synthetic HFOs. U.S. Pat. No. 7,279,451 disclosed 2,3,3,3-tetrafluoropropene (HFO-1234yf) as a refrigerant which had a GWP of less than 1000, but the refrigerant was flammable. U.S. Pat. No. 8,318,039 disclosed a non-flammable binary mixed refrigerant R134a/HFO-1234yf which had a GWP of greater than 400. CN105038711A disclosed a mixed refrigerant containing 1,1-difluoroethane, which was composed of, by mass percentage, the following components: 1-98% of 1,1-difluoroethane (R152a), 1-98% of 2,3,3,3-tetrafluoropropene (R1234yf) and 1-98% of 1,1,1,2-tetrafluoroethane (R134a). Most of the components are flammable, and the GWP will exceed 400 in some composition ratios.

Therefore in the art, it is necessary to develop a non-flammable refrigerant with a GWP of less than 400 (preferably less than 150) to meet the requirements of the EU F-gas regulations.

SUMMARY

In view of the problems in the prior art, the object of present disclosure is to provide a mixed refrigerant and use thereof, and in particular to provide a mixed refrigerant, which is non-flammable and can reduce the greenhouse effect (low GWP), and use thereof. The mixed refrigerant of the present disclosure is non-flammable and azeotropic or near-azeotropic.

To achieve this, the present disclosure employs the following technical solutions.

The present disclosure provides a mixed refrigerant comprising, by mass fraction, 10-30% of R134a, 5-70% of R1234ze(E), and 18-65% of R1234yf.

The mixed refrigerant of the present disclosure is a non-flammable, azeotropic or near-azeotropic, mixed refrigerant.

Preferably, the mixed refrigerant has an ozone depletion potential (ODP) of 0 and a GWP of less than or equal to 400. For example, the GWP is 400, 380, 350, 330, 300, 280, 250, 200, 180, 150, 130, or 100 etc. Preferably, the ODP is 0 and the GWP is less than or equal to 150.

In present disclosure, the mixed refrigerants consisting of R134a, R1234yf and R1234ze(E) are ternary, azeotropic or near-azeotropic, mixed refrigerants. The mixed refrigerants are non-flammable, have a GWP of less than or equal to 400, or even no more than 150, and have a small temperature glide when used as refrigerants.

In the mixed refrigerant of present disclosure, the mass fraction of the R134a can be 10%, 12%, 15%, 18%, 20%, 22%, 25%, 28% or 30% etc.; the mass fraction of R1234ze(E) can be 5%, 8%, 10%, 13%, 15%, 18%, 20%, 25%, 28%, 30%, 35%, 38%, 40%, 45%, 48%, 50%, 55%, 58%, 60%, 65%, 68% or 70% etc.; the mass fraction of R1234yf can be 18%, 20%, 23%, 25%, 28%, 30%, 32%, 35%, 38%, 40%, 42%, 44%, 48%, 50%, 53%, 56%, 59%, 62% or 65% etc. In the present disclosure, if R134a content is too high, more than 30%, for example, 40%, the GWP will exceed 500.

In a preferred embodiment, the mixed refrigerant comprises, by mass fraction, 30% of R134a, 49% of R1234ze (E), and 21% of R1234yf.

In another preferred embodiment, the mixed refrigerant comprises, by mass fraction, 22% of R134a, 30% of R1234ze (E) and 48% of R1234yf.

In another preferred embodiment, the mixed refrigerant comprises, by mass fraction, 11.3% of R134a, 69.8% of R1234ze(E) and 18.9% of R1234yf.

In another preferred embodiment, the mixed refrigerant comprises, by mass fraction, 10.1% of R134a, 54.5% of R1234ze(E), and 35.4% of R1234yf.

In another preferred embodiment, the mixed refrigerant comprises, by mass fraction, 10% 20 of R134a, 34% of R1234ze(E), and 56% of R1234yf.

In the mixed refrigerant of present disclosure, it is necessary to use R1234ze(E) in combination with R134a and R1234yf to obtain the azeotropic or near-azeotropic mixed refrigerant, however, the isomer of R1234ze(E), R1234ze (Z), cannot form an azeotropic or near-azeotropic mixed refrigerant in combination with R134a and R1234yf.

The mixed refrigerants of the present disclosure which have an ODP of 0 and a GWP of less than or equal to 400 GWP and are non-flammable meet environmental protection and safety requirements, and can be used to replace R134a, R22, R11, R245fa, R236fa, R410A, R407C, R417A, R422A, R507A, R502A and R404A etc.

In addition, according to the principle of complementary advantages, the mixed refrigerant of the present disclosure can further be mixed with other refrigerants. The mixed refrigerant can further include, for example, preferably, any one selected from the group consisting of refrigerants R32, R152a, R134, R227ea, R236fa, R125 and CF3I, or a combination of at least two selected therefrom. The mixed refrigerant may be further mixed with such refrigerants to achieve better environmental protection, non-flammability and better performance etc. Compared to natural refrigerants (such as R290, NH3 and CO2 etc.), which are flammable and toxic and need a high pressure, the mixed refrigerants of the present disclosure are the development direction of environmentally friendly refrigerants.

However, since the HFO-based refrigerants have a C=C double bond, the stability is relatively poor, and C=C double bond polymerization occurs under extreme conditions. Therefore, preferably, the mixed refrigerant of the present disclosure further comprises a stabilizer.

Preferably, the stabilizer includes, but is not limited to, one selected from the group consisting of alkyl aryl ether, thioalchohol, lactones, thioethers, nitromethane, alkyl silanes, benzophenone derivatives, diethylene terephthalic acid and diphenylterephthalic acid, or a mixture of at least two selected therefrom.

In another aspect, the present disclosure provides the use of the mixed refrigerant as described above in a refrigeration system.

The mixed refrigerants of the present disclosure can be used as refrigerants in refrigeration, air conditioning and heat pump systems, replacing R134a, R22, R11, R245fa, R236fa, R410A, R407C, R417A, R422A, R507A, R502A and R404A etc. commonly used in these refrigeration systems.

For the application of the mixed refrigerants of the present disclosure, direct infusion can be realized with little or no modification to existing equipment and production lines.

Preferably, the refrigeration system further comprises lubricating oil. Preferably, the lubricating oil comprises any one selected from the group consisting of natural mineral oil, polyalkylene glycol (PAG), polyol ester (POE), alkyl benzene (AB), poly-alfa olefin (PAO) and polyvinyl ether (PVE), or a combination of at least two selected therefrom.

Lubricating oil is present in the form of liquid inside the compressor of the refrigeration system to lubricate the moving parts inside the compressor. In the refrigeration cycle, a portion of the lubricating oil is carried away from the compressor by the refrigerant, and carried back to the compressor when the refrigerant recycles back, which is related to the solubility of the refrigerant and lubricating oil. The higher the solubility of the refrigerant in the lubricating oil, the easier the lubricating oil is brought back to the compressor. However, if the solubility of the refrigerant in the lubricating oil is too high, the viscosity of the lubricating oil will be decreased such that the moving parts of the compressor are susceptible to wear and tear. Detergents, dispersants, extreme pressure anti-wear agents, friction modifiers, antioxidants, anti-foaming agents, anti-emulsifiers, anti-oxidation and anti-corrosion agents, oil-based agents, anti-rust agents, sticky modifiers and pour point depressants are generally added to the lubricating oil to improve the lubricating oil's performance.

In another embodiment, the present disclosure provides the use of the mixed refrigerants as described above as blowing agents or aerosol propellants.

The mixed refrigerants of the present disclosure can be used as foaming agents in various foaming industries or as environmentally friendly aerosol propellants. They have the advantages of non-flammability, low ozone depletion potential, safety and reliability.

Compared with the prior art, the present disclosure has the following benefits:

The combination of the amount of each component of the mixed refrigerant of the present disclosure makes it non-flammable and have an ODP of 0 and a GWP of no more than 400. The mixed refrigerant of the present disclosure can be used in refrigeration systems, causing no ozone destruction, reducing the greenhouse effect, and having a small temperature glide. It belongs to a ternary, azeotropic or near-azeotropic refrigerant, which is beneficial to the stable operation of a refrigeration system. The mixed refrigerants of the present invention can also be used as foaming agents or aerosol propellants, and have the advantages of non-flammability, low ozone depletion potential, low greenhouse effect, environmental friendliness, safety and reliability.

DETAILED DESCRIPTION

The technical solutions of the present disclosure will be further illustrated by way of the following embodiments. It should be understood by those skilled in the art that these embodiments are only intended to aid the understanding of the present disclosure and should not 30 to be considered as limitation thereto.

Example 1

In this example, a mixed refrigerant which comprised, by mass fraction, 11.3% of R134a, 69.8% of R1234ze(E) and 18.9% of R1234yf was provided.

Example 2

In this example, a mixed refrigerant which comprised, by mass fraction, 10.1% of R134a, 54.5% of R1234ze(E) and 35.4% of R1234yf was provided.

Example 3

In this example, a mixed refrigerant which comprised, by mass fraction, 10% of R134a, 34% of R1234ze(E) and 56% of R1234yf was provided.

Example 4

In this example, a mixed refrigerant which comprised, by mass fraction, 22% of R134a, 48% of R1234ze(E) and 30% of R1234yf was provided.

Example 5

In this example, a mixed refrigerant which comprised, by mass fraction, 30% of R134a, 49% of R1234ze(E) and 21% of R1234yf was provided.

Example 6

In this example, a mixed refrigerant which comprised, by mass fraction, 30% of R134a, 5% of R1234ze(E), and 65% of R1234yf was provided.

Example 7

In this example, a mixed refrigerant which comprised, by mass fraction, 10% of R134a, 25% of R1234ze(E) and 65% of R1234yf was provided.

Under the air conditioning test conditions of ARI Standard 520: evaporation temperature 7.2° C., condensation temperature 54.4° C., superheat temperature 11.1° C., undercooling temperature 8.3° C. and compressor isentropic efficiency 0.8, the environmental parameters, physical properties and thermal properties of R134a and the mixed refrigerants in Examples 1-7 were measured and results are listed in Table 1.

TABLE 1

|  | Example 1 | Example 2 | Example 3 | Example 4 | Example 5 | Example 6 | Example 7 | R134a |
|---|---|---|---|---|---|---|---|---|
| ODP | 0 | 0 | 0 | 0 | 0 | 0 | 0 | 0 |
| GWP | 147 | 132 | 130 | 286 | 390 | 390 | 130 | 1300 |
| Molecular weight g/mol | 112.54 | 112.7 | 112.71 | 111.16 | 110.15 | 110.15 | 112.71 | 102.03 |
| Evaporating pressure kPa | 296.86 | 308.6 | 337.45 | 324.79 | 327.56 | 402.18 | 353.84 | 376.84 |
| Condensing pressure kPa | 1132.54 | 1140.49 | 1198.21 | 1195.48 | 1221.62 | 1445.42 | 1242.05 | 1475.82 |
| Exhaust temperature ° C. | 66.8 | 65.9 | 65.2 | 66.7 | 67.61 | 68.23 | 65.04 | 74.8 |
| Temperature glide ° C. | 0.55 | 0.94 | 1.58 | 1.17 | 1.05 | 0.66 | 1.72 | — |
| COP* | 1.03 | 1.04 | 1.05 | 1.05 | 1.11 | 1.03 | 1.06 | 1 |
| Cooling capacity* | 0.91 | 0.89 | 0.87 | 0.9 | 0.82 | 0.87 | 0.86 | 1 |
| Volume cooling capacity* | 0.79 | 0.8 | 0.86 | 0.85 | 0.86 | 1.01 | 0.90 | 1 |

Remarks: * in Table 1 indicates relative values of various parameters compared to the corresponding value of R134a, wherein COP is Coefficient of Performance.

It can be seen from Table 1 that the mixed refrigerants as prepared in Examples 1-7 had an ODP of 0, a GWP of less than or equal to 400 and a temperature glide of less than 1° C. or close to 1° C. They belonged to azeotropic or near-azeotropic refrigerants, which were beneficial to the stable operation of the system. The evaporating pressure and condensing pressure of the mixed refrigerants were equivalent to those of R134a, and they can be directly used to replace R134a in systems without great modification. Compared with R134a, the cooling capacity and volume cooling capacity of the mixed refrigerants were both lower than those of R134a by about 10%; COP was 3-11% higher than that of R134a, and the exhaust temperature was also lower, which was beneficial to reduce the exhaust temperature of the compressor.

The explosion limits of the mixed refrigerants in Examples 1-7, R600a (R600a was used to verify the accuracy of equipment used in the flammability test), R1234ze (E) and R1234yf were measured according to the ASHRAE 34 standard. The experiments were performed in a 12 L round bottom flask. The ignition source was the induction spark between two electrodes with an alternating current of 30 mA, 15 KV, and a spark duration of 0.4 s. The electrodes were L-shape, made of tungsten and had a diameter of 1 mm. The two electrodes were 6.4 mm apart. The electrodes were mounted at a height of ⅓ from the bottom of the bottle. The angle of flame propagation was determined by observation and was used to determine the flammability. If the angle between the center of the electrodes and the flame frontier on the flask wall was less than 90 degree, the refrigerant was non-flammable; if the angle was greater than 90, it was flammable. The test results are shown in Table 2, wherein LFL represents the lower flammable limit, UFL represents the upper flammable limit and if there are no LFL or UFL values, the refrigerant is not flammable.

TABLE 2

| Refrigerant | LFL (v %) | UFL (v %) | Notes |
|---|---|---|---|
| R600a | 1.8 | 8.5 |  |
| R1234ze(E) | 7 | 9.5 |  |
| R1234yf | 6.2 | 12.3 |  |

TABLE 2-continued

| Refrigerant | LFL (v %) | UFL (v %) | Notes |
|---|---|---|---|
| Example 1 | NA | NA | None-flammable |
| Example 2 | NA | NA | None-flammable |
| Example 3 | NA | NA | None-flammable |
| Example 4 | NA | NA | None-flammable |
| Example 5 | NA | NA | None-flammable |
| Example 6 | NA | NA | None-flammable |
| Example 7 | NA | NA | None-flammable |

Table 2 shows that the mixed refrigerants of the present disclosure were non-flammable. The mixed refrigerants of Examples 1-7 were charged into a pressure resistant container with an observation window. The temperature in the container was kept at 25° C. and the mixed refrigerant was in a vapor-liquid equilibrium state. The initial vapor pressure in the container was measured, and then the refrigerant in the container was discharged slowly in order to keep the temperature constant until 50% weight percent of the mixed refrigerant was discharged. At this time, a part of liquid was still present in the container. The vapor pressure was measured again. Changes in pressure values before relief ant that after relief are shown in Table 3.

TABLE 3

| Refrigerant | Pressure before relief (kPa) | Pressure after 50% relief (kPa) | Change in pressure (%) |
|---|---|---|---|
| Example 1 | 630.62 | 588.5 | 6.68 |
| Example 2 | 660.94 | 626.12 | 5.27 |
| Example 3 | 653.57 | 647 | 1 |
| Example 4 | 736.52 | 675.36 | 8.3 |
| Example 5 | 623.76 | 612.75 | 1.7 |
| Example 6 | 704.53 | 703.44 | 0.2 |
| Example 8 | 667.14 | 662.65 | 0.7 |

Table 3 shows that pressure changes before and after relief were less than 10% and that the mixed refrigerants were azeotropic or near-azeotropic.

The embodiments above are used to illustrate the mixed refrigerants of the present disclosure and use thereof; however, the present disclosure is not limited to the above embodiments, and it does not mean that the present disclosure must rely on the above embodiments to be implemented. It should be understood by those skilled in the art that any improvements of the present disclosure, the equivalent replacement of the raw materials of the present disclosure, the addition of auxiliary components and the selection of specific means etc. will all fall within the scope of protection and disclosure of the present disclosure.

We claim:

1. A mixed refrigerant consisting of, by mass fraction, 10-3025% of R134a, 5-70% of R1234ze(E), and 18-65% of R1234yf, wherein the mixed refrigerant has an ODP of 0 and a GWP of less than or equal to 400.

2. The mixed refrigerant according to claim 1, wherein the mixed refrigerant is non-flammable and azeotropic or near-azeotropic.

3. The mixed refrigerant according to claim 1, wherein the mixed refrigerant has an ODP of 0 and a GWP of less than or equal to 150.

4. A refrigeration system consisting of the mixed refrigerant according to claim 1.

5. A foaming agent consisting of the mixed refrigerant according to claim 1.

6. An aerosol propellant consisting of the mixed refrigerant according to claim 1.

* * * * *